(12) United States Patent
Cardinali

(10) Patent No.: US 10,485,251 B2
(45) Date of Patent: Nov. 26, 2019

(54) SPAGHETTI-LIKE LONG PASTA SHAPE AND RELATIVE PRODUCTION DEVICE

(71) Applicant: Rustichella d'Abruzzo S.p.A., Pianella (IT)

(72) Inventor: Andrea Cardinali, Pescara (IT)

( * ) Notice: Subject to any disclaimer, the term of this patent is extended or adjusted under 35 U.S.C. 154(b) by 0 days.

(21) Appl. No.: 16/105,913

(22) Filed: Aug. 20, 2018

(65) Prior Publication Data

US 2018/0352837 A1 Dec. 13, 2018

Related U.S. Application Data

(63) Continuation of application No. 15/119,105, filed as application No. PCT/EP2015/053428 on Feb. 18, 2015, now Pat. No. 10,092,025.

(30) Foreign Application Priority Data

Mar. 18, 2014 (IT) .............. PS2014A0003

(51) Int. Cl.
*A23P 30/20* (2016.01)
*A23L 7/109* (2016.01)
*B29C 48/09* (2019.01)
*B29C 48/345* (2019.01)
*B29C 48/70* (2019.01)

(52) U.S. Cl.
CPC .............. *A23L 7/109* (2016.08); *A23P 30/20* (2016.08); *B29C 48/09* (2019.02); *B29C 48/345* (2019.02); *B29C 48/705* (2019.02); *A23V 2002/00* (2013.01)

(58) Field of Classification Search
CPC ..... B29C 48/09; B29C 48/345; B29C 48/705; A23P 30/00; A23P 30/20
See application file for complete search history.

(56) References Cited

U.S. PATENT DOCUMENTS

| | | | | | |
|---|---|---|---|---|---|
| 1,618,256 | A | * | 2/1927 | Wuthrich | A21C 11/16 425/464 |
| 2,141,005 | A | * | 12/1938 | Lussie | B29C 48/30 425/464 |
| 3,405,424 | A | * | 10/1968 | Imobersteg | D01D 5/24 425/464 |
| 4,376,624 | A | * | 3/1983 | Osrow | A21C 11/16 425/464 |

* cited by examiner

*Primary Examiner* — Joseph S Del Sole
*Assistant Examiner* — Joseph S Leyson
(74) *Attorney, Agent, or Firm* — Themis Law

(57) ABSTRACT

A spaghetti-like long shaped pasta has a continuous internal longitudinal cavity communicating with the outside through a co-extended longitudinal slot with convex edges that delimit the internal cavity. A device for the production of such pasta includes an extrusion drawing having, at the entry front, a plurality of holes with complementarily identical openings that lead into respective channels of identical shape, configuration and size, which end in a joint discharge channel, near an edge of an expanded head. An occlusion at the outlet hole of the discharge channel includes a septum separating the delivery channels and causing the two flows of extruded pasta to join solely on a peripheral portion, opposite to the cavity edge, with the expanded head producing the internal cavity that develops longitudinally within the finished product and communicates with the outside through a co-extended cutting or fissure.

5 Claims, 6 Drawing Sheets

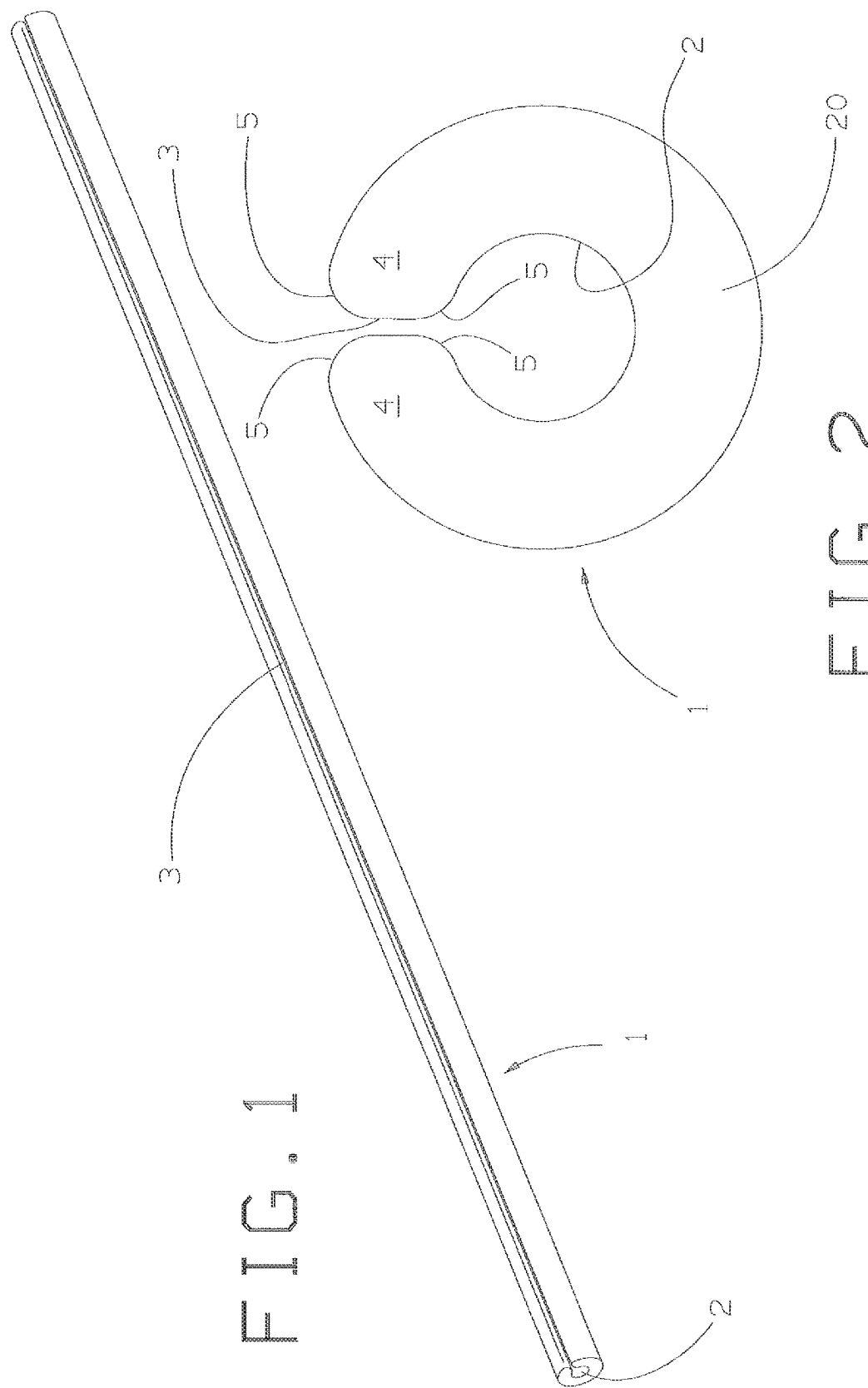

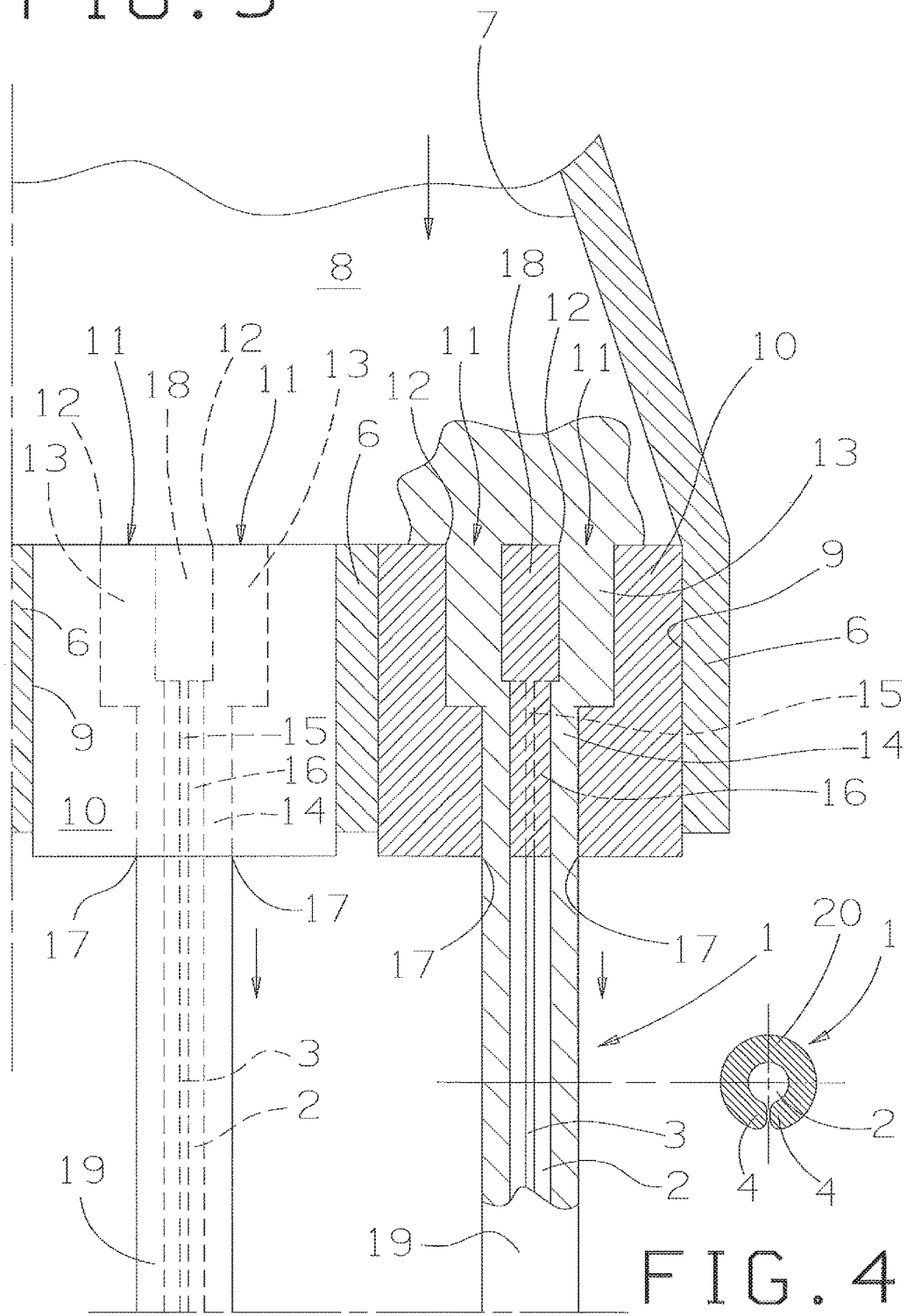

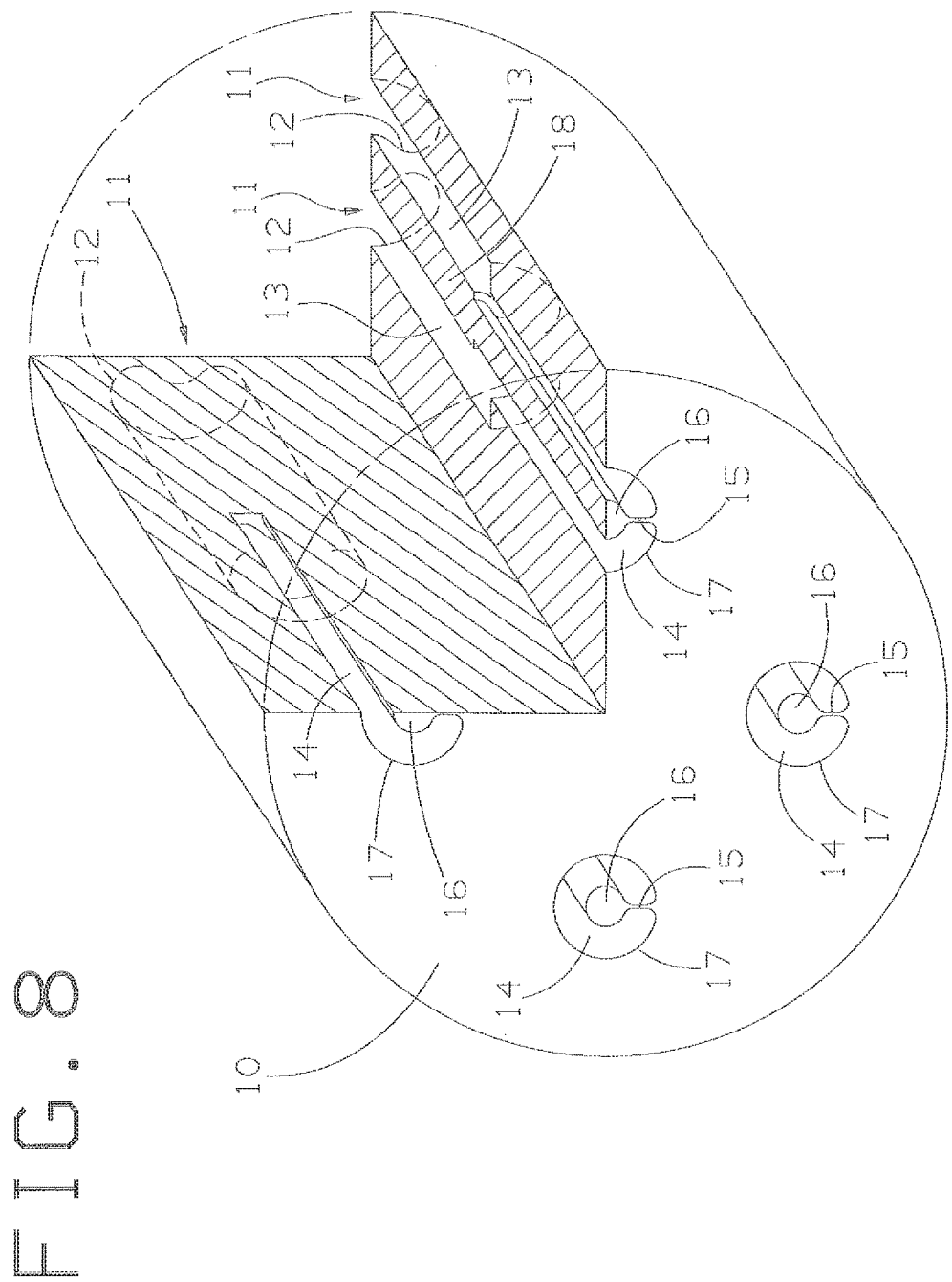

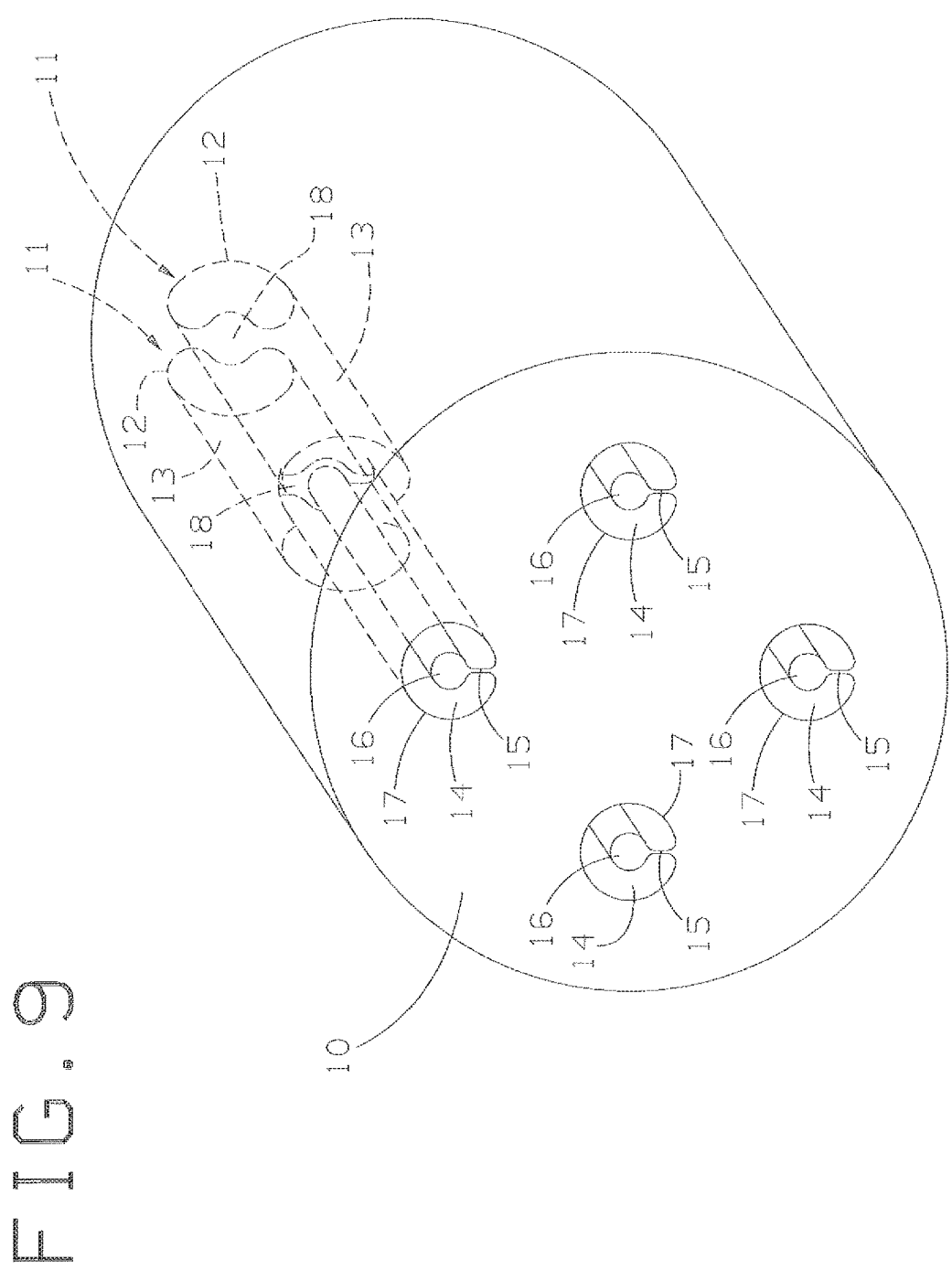

SPAGHETTI-LIKE LONG PASTA SHAPE AND RELATIVE PRODUCTION DEVICE

FIELD OF THE INVENTION

Both in private kitchens and restaurants, there arises the need of reducing pasta cooking times, with the aim of preparing it at home, or serving upon request, in a few minutes.

An empirical answer to this need is usually provided, especially in the restaurant industry, with the food pre-cooking technique, by which the pasta is removed in advance from the cooking water and kept partly raw in the estimated amount with respect to the overall need, and then, within a few minutes, is brought to the desired level of cooking through a new boiling in the required amounts.

This technique considerably jeopardizes the organoleptic characteristics of the food, the respective perceptions to touch and taste.

In the specific industry of spaghetti and similar long pasta, to which the present invention refers, there has already been conceived a solution concept, described in Italian Industrial Invention patent no. IT1201244B and in the corresponding U.S. Pat. No. 4,752,205B, which provides for making, during the forming stage, one or more longitudinal grooves in the body of the pasta thread, so that during the boiling the mass to be subjected to boiling is less, and thus more exposed such to further reduce cooking times.

Though attaining the reduction of the product cooking times, this solution concept does not allow maintaining, in the product, shape characteristics similar to the spaghetti when cooked, in that the fins at the sides of the grooves are open, so that the cooked product substantially appears like a "folded tagliatella", or something similar in terms of irregular shape;

in addition, the product is not even pleasant to touch and taste, in that it is not uniform in terms of firmness, especially with reference to the ends of the fins, which entirely lose consistency, in that they have a non-uniform thickness with respect to the rest of the product.

OBJECTS OF THE INVENTION

Thus, the main object of the present invention, in the context outlined above, is to provide a pasta shape of the spaghetti type, or the like, capable of allowing a radical reduction of the cooking times.

Another object of the present invention is to attain the aforementioned main object of reducing the cooking times but with uniform cooking of the product itself over the entire relative length, thickness and shape, through a pasta shape capable of allowing maintaining the organoleptic characteristics, of touch, flavor and aspect, substantially comparable with the classic analogous ones provided according to the prior art.

Another object of the present invention is to provide a device for the obtainment and industrial production of the pasta shape according to the present invention, capable of being utilized in pasta production lines according to the prior art.

A further object of the present invention is to attain the aforementioned objects through a simple and efficient implementation concept, that is safe in operation and relatively inexpensive considering the results that can be practically attained therewith.

SUMMARY EXTRACT OF INVENTION

These and other objects shall be attained with the spaghetti-like long pasta shape according to the present invention, comprising, within the straight thread-like pasta body (1) a preferably circular section, a continuous internal longitudinal cavity (2), preferably centered to generate walls of homogeneous thickness, communicating with the external through a co-extended longitudinal cut (3) of the body (1), defined by pasta strips (4) with rounded angles (5) mutually approached to close the internal cavity (2) without coming in contact with the raw product; as well as with the device for the relative production according to the present invention, comprising an extrusion drawing (6) with matrix extruders (10), preferably made of bronze or Teflon, constituted on the entry front by at least two holes (11) for each through drawing element (13, 14), having a complementarily identical opening for introduction (12) within respective channels (13), having a complementarily identical shape, configuration and size; said introduction channels (13) terminating in a joint discharge channel (14), near an edge (15) with an expanded head (16), preferably cylindrical, positioned and shaped to partly occlude up to the outlet hole (17) said discharge channel (14), such occlusion being centrally partialized and on a segment or radius contiguous—in a coplanar manner—to at least one septum (18) for separating the delivery channels (13), so as to allow the joining of the two flows (19) of extruded pasta solely on a peripheral portion (20), preferably arch-shaped, opposite to said edge (15), said expanded head (16) constituting a matrix for the central compartment (2), developing longitudinally within the finished product (1) alongside the latter, communicating with the external through a co-extended cutting or fissure (3) of failed joining of the flows of product (19) due to the minor thickness of the edge (15).

BRIEF DESCRIPTION OF THE DRAWINGS

Further characteristics and advantages, of the pasta shape and of the device for the relative production according to the present invention, shall be more apparent from the following detailed description of a relative preferred but non-exclusive embodiment, represented solely by way of non-limiting example by four attached drawings, wherein:

FIG. 1 shows a perspective view of the spaghetti-like long pasta shape according to the present invention.

FIG. 2 shows a cross-sectional view of the spaghetti-like long pasta shape according to the present invention.

FIG. 3 shows a longitudinal sectional view of a schematic portion of a production plant of the spaghetti-like long pasta shape according to the present invention, comprising the devices for the relative production according to the present invention, also longitudinally sectioned.

FIG. 4 shows a cross-sectional view of the spaghetti-like long pasta shape according to the present invention as produced by the plant of FIG. 3.

FIG. 8 shows a sectional and transparent perspective view of the device for producing the spaghetti-like long pasta shape according to the present invention.

FIG. 9 shows a transparent perspective view of the device for producing the spaghetti-like long pasta shape according to the present invention.

STATIC DESCRIPTION OF AN EMBODIMENT OF THE INVENTION

Figure 5:
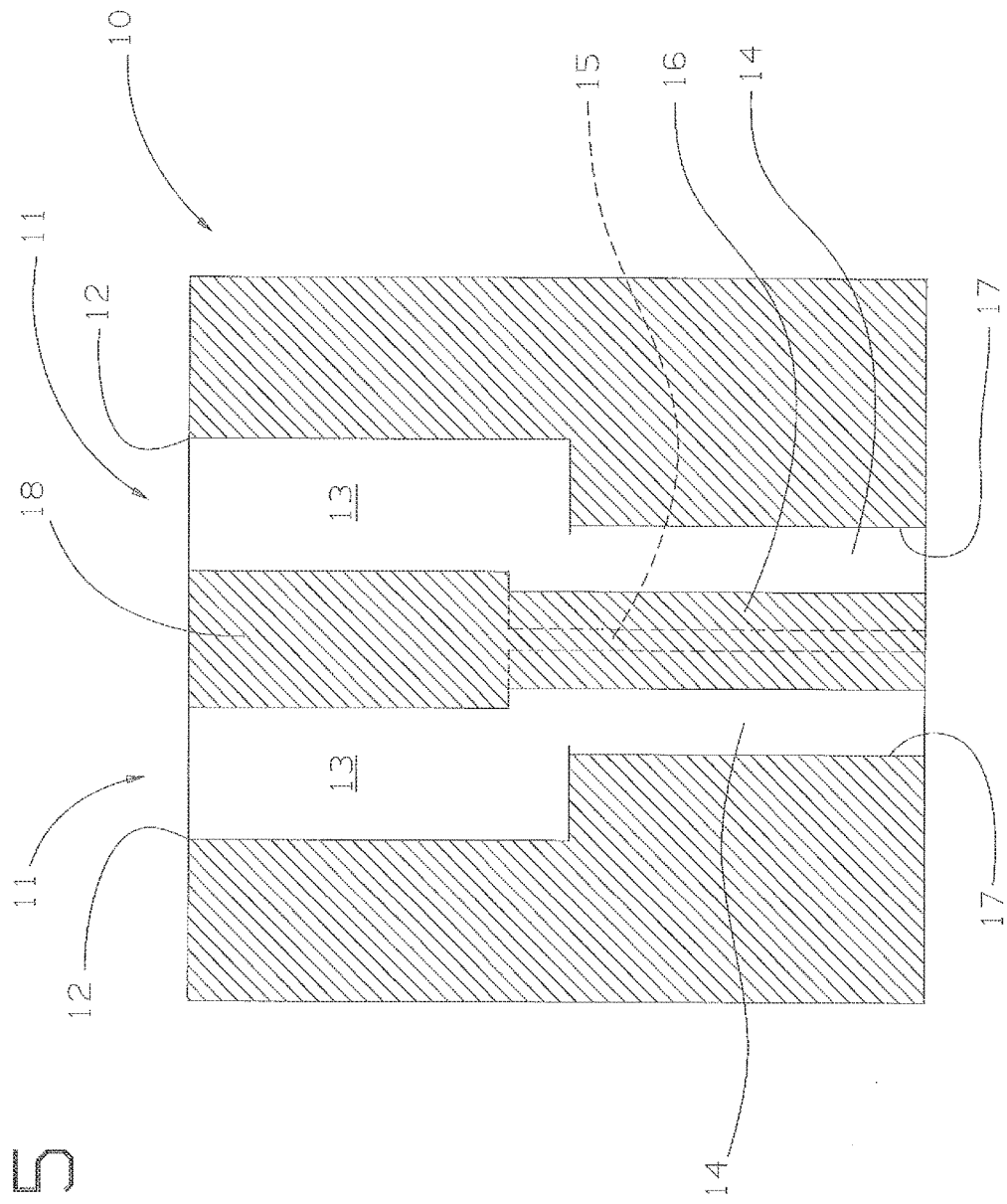
FIG. 5 shows a longitudinal sectional view of a device for producing the spaghetti-like long pasta shape according to the present invention.

With reference to such figures, and in particular FIG. 1, the spaghetti-like long pasta shape according to the present invention, comprising, within the straight thread-like pasta body 1, with a preferably circular section, a continuous internal longitudinal cavity 2, communicating with the external through a co-extended longitudinal cut 3 of the body 1, defined by strips 4 of pasta rounded angles 5, mutually approached to close the internal cavity 2, without coming to contact with the raw product is indicated in its entirety with 1.

In FIG. 3, with 6 there is partly schematically illustrated in longitudinal section a drawing of a pasta production plant, such drawing 6 to be deemed rectangular-shaped, as usual for long pasta shapes, with the aim of attaining the extruded filaments 1 in line, similar to a curtain, to allow the relative removal by the piling canes, not illustrated, thus made to pass in succession in the appropriate step according to the extrusion speed, as known in the prior art.

On the drawing 6, with 7 there is schematically indicated the compression chamber, wherein an auger-like device positioned at the upper part, not illustrated, presses a pasta mass 8.

Through the drawing 6 there are made holes 9, for inserting through drawing inserts 10 for example cylindrical and preferably made of bronze or Teflon, or matrix extruders 10 specifically constituting the device for producing the spaghetti-like long pasta shape 1 according to the present invention.

Figure 6:
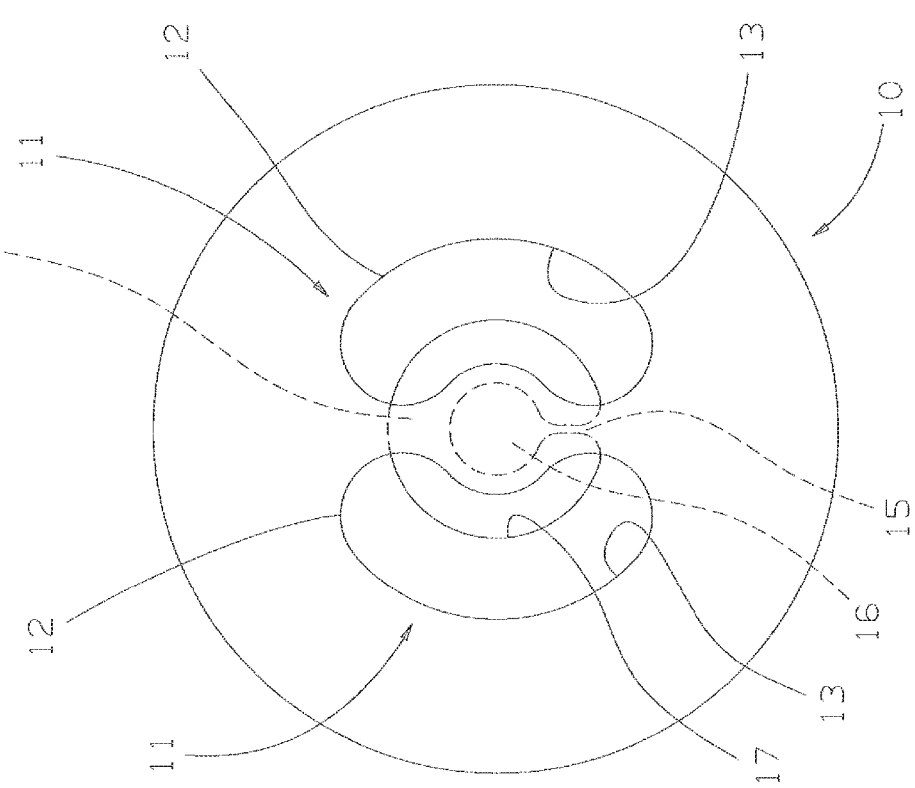
FIG. 6 shows a front view of the device for producing the spaghetti-like long pasta shape according to the present invention on the entry front of the product to be shaped.

The matrix extruders 10 have any plurality of through drawings, for example four in the described embodiment, comprising on the entry front of the pressed mass 8 at least two holes, indicated in their entirety with 11 (see FIGS. 5 and 6), provided with a complementarily identical opening for introduction 12 within respective channels 13 having a complementarily identical shape, configuration and size.

Figure 7:
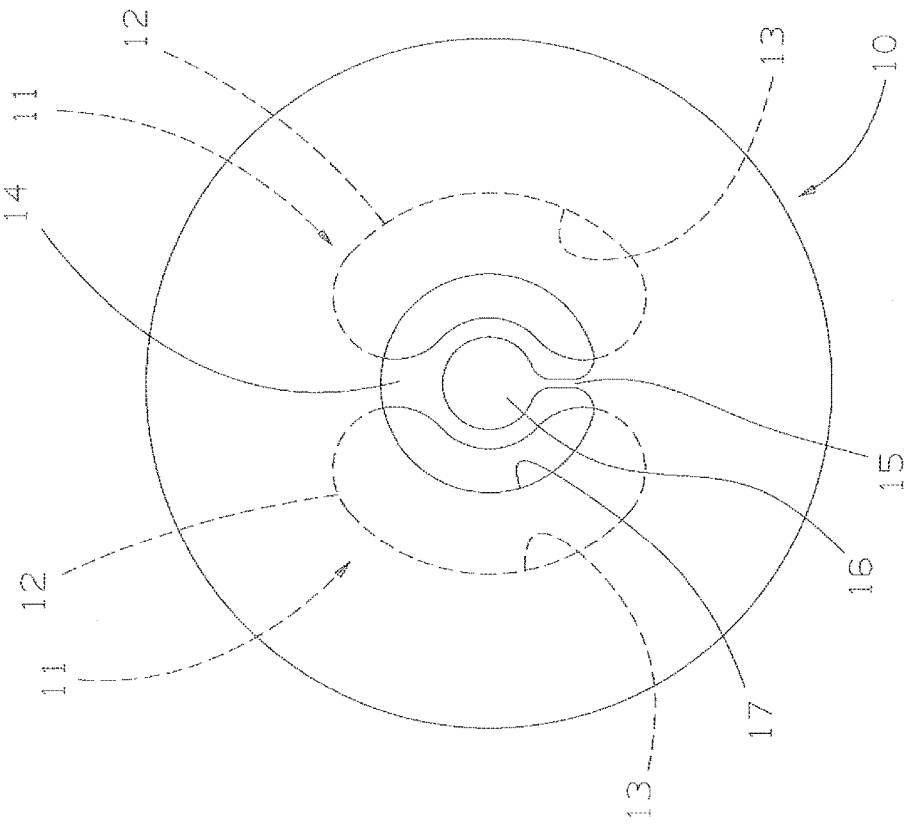
FIG. 7 shows a front view of the device for producing the spaghetti-like long pasta shape according to the present invention on the outlet front of the shaped product.

The introduction channels 13 terminate in a joint discharge channel 14 (see FIGS. 5 and 7), near an edge 15, with expanded head 16, preferably cylindrical, and profile connected in an arched manner to the wall of the discharge channel 14 and to said head 16.

The edge 15, with relative expanded head 16, is positioned and shaped to partly occlude, up to the outlet hole 17, said discharge channel 14; such occlusion is centrally partialized at the head 16 and on a segment or radius, i.e. at the edge 15, contiguous—in a coplanar manner—to at least one septum 18 for separating the delivery channels 13 so as to allow the joining of the two flows of extruded pasta 19 solely on a peripheral portion 20 preferably arch-shaped, opposite to said edge, for the functions specified hereinafter.

Dynamic Description of an Embodiment of the Invention

Thus, having completed the static description of a preferred embodiment of the pasta shape and the device for the relative production according to the present invention, below is the dynamic description, or the relative operation:

like in the plants according to the prior art, the auger, not illustrated, presses about 140 bars the irregular pasta mass 8 within the compression chamber 7, from which it extrudes in line through the through holes of the drawing of the drawing inserts 10.

In each of these, the pasta penetrates into the identical complementary channels 13 through the inlets 12 of the inlet holes 11, forming two or more flows of extruded pasta 19, which converge near the partitioning edge 15 and around the cylindrical expanded head 16 within the discharge channel 14.

Said expanded head 16 constitutes a matrix for the central compartment 2 developing longitudinally within the finished product 1 alongside the latter, communicating with the external through a co-extended cutting or fissure 3 of failed joining of the two flows 19 of product, defined within the discharge channel 14 by the thickness of the partitioning edge 15.

The curved fittings of the partitioning edge 15 on the surface of the channel 14 and the expanded head 16 in turn define the rounding 5 of the corners of the strips 4 of pasta which define the longitudinal cutting 3 for communication with the inner compartment 2 in the finished product 1.

Such extrusion procedure, preventing the free convergence of the two original identical flows 19 of pasta within the discharge channel 14, though forcing them to reduce within the gap that remains therein on the sides of the partitioning edge 15 of the discharge channel 14 and around the cylindrical head 16, causes the densification of the matter, mainly at the small linear front for joining the flows 19, or at the peripheral portion 20 of the pasta-body 1 opposite to the longitudinal cutting 3.

Such densification integrates in the finished product an "elastic memory", so that when it is boiled the relative cooking times are radically lesser, given that the pasta is exposed to the cooking water both on the outer surface and on the inner surface within the channel 2, but the pasta strips 4 defining the continuous longitudinal cutting 3 do not end up splitting like in the prior art, but on the contrary they tend to converge and contrary to the prior art solutions the relative increase of cooking volume leads to close the longitudinal cutting 3 in the cooked product, which takes up a spaghetti-like shape, which substantially cannot be distinguished from it, wherein the rounding of the corners 5 of the original strips 4 prevents the presence of thin angular appendages which tend to tear during the cooking.

The section of the product, somehow similar to an "open toroid", which is a major characteristic of the invention, allows obtaining a thickness of the pasta substantially uniform at all points, this being a fundamental condition for attaining a uniform cooking.

Alternative Embodiments

It is obvious that in further alternative embodiments, still falling within the same concept solution under the embodiment illustrated above and claimed below, the pasta shape with device for the relative production according to the present invention, may be obtained or implemented with equivalent technical and structural elements, or provided with further supplementary solutions, same case applying to all configurations of the relative constituents and the implementation interventions may vary to suit the purpose.

Firstly, the spaghetti shape may have any alternative shape with respect to the circular one described in the example, for example square/rectangular/triangular-shaped, like in the so-called "spaghetti alla chitarra", or "bavette", or ellipsoidal like in the so-called "linguine" or "trenette", or any other shape.

The inlet holes and the delivery channels may be more than two, for example three, especially for pasta shapes or similar with larger dimension, wherein the edge or the like of the single outlet conduit shall in this case be positioned to continue one of the three septa that separate the three delivery units.

There may be provided an alternative embodiment of the device wherein the edge with expanded head of the discharge channel is conceived with a given small distance from the partitioning septum of the convergence flows, thus acquiring the function, also possibly the configuration, of a plough which detaches the previously joined flows.

Advantages of the Invention

As clearly observable from the afore-outlined description of a preferred embodiment and also as mentioned above regarding some variant embodiments, the pasta shape with device for the relative production according to the present invention offers advantages corresponding to the attainment of the preset objects and even others:

it integrates a solution adapted to attain a common pasta shape, probably the most common worldwide, suitable to be designed drastically reducing the cooking times, without pre-cooking or using pre-gelatinized flower/meal and maintaining the organoleptic characteristics under all aspects substantially comparable to the homologous conventional product.

Key to the Reference Numbers 1 spaghetti shape in its entirety
2 continuous internal longitudinal cavity of the spaghetti shape
3 continuous longitudinal cutting of the spaghetti shape
4 pasta strips of equal thickness defining the continuous longitudinal cutting
5 rounded angles of the pasta strips defining the continuous longitudinal cutting
6 drawing of the production plant
7 chamber for the compression of the pasta mass
8 pasta mass
9 drawing holes for introducing drawing inserts or matrix extruders
10 drawing inserts or matrix extruders
11 inlet holes in their entirety
12 opening of the inlet holes
13 introduction channels or delivery channels
14 discharge channel
15 edge for partitioning the discharge channel
16 cylindrical expanded head of the edge for partitioning the discharge channel
17 outlet hole
18 septum for separating introduction channels or delivery channels
19 flows of extruded pasta
20 peripheral portion of the spaghetti shape opposite to the longitudinal cutting

The invention claimed is:

1. A device for production of spaghetti-shaped elongated pasta comprising:
   a straight thread-shaped pasta body having one continuous internal longitudinal cavity communicating with an outside through one co-extended longitudinal slot in the pasta body, the slot being defined by edges of pasta strips mutually approached to essentially close the internal cavity without coming to contact with one another,
   the device comprising:
   one or more matrix extruders each having,
   at least two entry holes each adapted to receive a pasta mass and connected to respective separate introduction channels divided by a partitioning septum and configured to produce separate pasta sheets, and
   a single discharge channel having a sheet partitioning structure coplanar to the partitioning septum of the separate introduction channels, the single discharge channel being configured to receive the separate pasta sheets and longitudinally join the separate pasta sheets to form the pasta body having the longitudinal slot,
   wherein the sheet partitioning structure has an expanded head positioned and shaped to partly occlude the discharge channel up to an outlet hole, and
   wherein the separate introduction channels and the single discharge channel cause a region of the pasta body where the pasta strips are longitudinally joined to have a higher density than adjoining regions of the pasta body.

2. The device according to claim 1, further comprising an extrusion line having the matrix extruders,
   wherein the extrusion line includes the at least two holes that have symmetrically identical openings for introduction into the respective separate introduction channels,
   wherein the separate introduction channels have a symmetrically identical shape, configuration and size and terminate in the single discharge channel, and
   wherein the expanded head generates an occlusion in the single discharge channel that causes the slot in the pasta body and also causes a longitudinal joining of the separate pasta sheets solely on a peripheral portion opposite to the slot, the expanded head causing the internal cavity to have larger diameter than a thickness of the slot.

3. The device according to claim 2, wherein the expanded head has a transverse profile that is connected to a wall of the discharge channel and to the head with arched segments that define a sheet partitioning structure.

4. The device according to claim 1, wherein the separate introduction channels and the single discharge channel are configured to reduce the pasta sheets when the pasta sheets are longitudinally joined.

5. The device according to claim 3, wherein the separate introduction channels and the single discharge channel are further configured to cause the edges of the pasta strips adjacent to the sheet partitioning structure defined by the arched segments to have higher densities than the adjoining regions of the pasta body.

* * * * *